(12) United States Patent
Dickey et al.

(10) Patent No.: US 6,625,673 B1
(45) Date of Patent: Sep. 23, 2003

(54) METHOD FOR ASSIGNING ADDRESSES TO INPUT/OUTPUT DEVICES

(75) Inventors: Kent A. Dickey, Westford, MA (US); Debendra Das Sharma, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/562,474

(22) Filed: May 1, 2000

(51) Int. Cl.[7] .............................................. G06F 12/00
(52) U.S. Cl. ................. 710/52; 710/3; 710/9; 710/56
(58) Field of Search ............................ 710/3, 9, 52, 56

(56) References Cited

U.S. PATENT DOCUMENTS

| | | | | |
|---|---|---|---|---|
| 4,340,932 A | * | 7/1982 | Bakula et al. ................. | 711/2 |
| 5,726,689 A | * | 3/1998 | Negishi et al. ............. | 345/430 |
| 5,835,965 A | * | 11/1998 | Taylor et al. ................ | 711/211 |
| 6,128,690 A | * | 10/2000 | Purcell et al. .............. | 710/240 |
| 6,370,633 B2 | * | 4/2002 | Sethi ........................... | 711/206 |
| 6,433,787 B1 | * | 8/2002 | Murphy ....................... | 345/556 |

\* cited by examiner

*Primary Examiner*—Jeffrey Gaffin
*Assistant Examiner*—Mohammad O. Farooq (57) ABSTRACT

An I/O mapping within a system memory of a computing system assigns a fixed address to each I/O device and I/O bridge in a larger address region of the system than the number of address bits of the I/O devices and/or the I/O bridges would allow. This fixed address assignment eliminates problems associated with fragmentation of I/O memory space of a conventional variable address assignment when I/O devices and/or I/O bridges are replaced on-line, i.e., hot-swapped. The I/O mapping utilizes a greater number of address bits than the address bits available from I/O devices to assign a much larger address space to each device by translating the larger number of bits address from the system to the smaller number of bits address of the I/O devices.

20 Claims, 5 Drawing Sheets

| | |
|---|---|
| DEVICE A<br>20000000 (Hex)<br>101 | 0x80000000(Hex) |
| | 0xA0000000(Hex) |
| DEVICE B<br>1000 (Hex)<br>102 | |
| | 0xA0001000(Hex) |
| DEVICE C<br>1000 (Hex)<br>103 | |
| | 0xA0002000(Hex) |
| 1 FFFF000(Hex)<br>104 | |
| | 0xC0001000(Hex) |
| DEVICE D<br>3FFFF000(Hex)<br>105 | |
| | 0xFFFFFFFF(Hex) |

METHOD FOR ASSIGNING ADDRESSES TO INPUT/OUTPUT DEVICES

TECHNICAL FIELD

The invention relates to computer memory and input/output systems. More particularly, the invention relates to assignment of addresses to input/output devices to facilitate on-line addition or deletion of input/output devices and to allow input/output devices having n address bits to be mapped into a larger address space than the n address bits would allow.

BACKGROUND OF THE INVENTION

In computer systems with input/output ("I/O") devices mapped into the normal processor address space (often referred to as the "system address space"), an assignment of addresses of each of the I/O devices in the system address space is generally required. Typically, an I/O device may include a programmable register to store its starting address in the system address space. In a multiple bus architecture system employing I/O bridges, the I/O bridges are in turn provided with similar flexibility in locating their respective addresses in the system address space.

Generally, since many small computer systems have a limited system address space, fixed addresses are not assigned to most I/O devices or bridges. Instead, as each I/O device and/or I/O bridge is discovered during the system initialization, i.e., during a "boot-up" process, a block of addresses is assigned to each discovered device and/or bridge, starting address of each address block closely following the block assigned to a previously discovered device and/or bridge.

Unfortunately, however, this dynamic assignment of I/O addresses at the system start-up often results in a fragmentation of the system address space when one or more I/O devices are "hot swapped", i.e., replaced while the system remains powered-up and after the system initialization—sometimes also referred to as on-line-replacement (OLR). For example, when an I/O device occupying an address block of a given size, e.g., a one megabyte (Mbyte) block, is removed from the system, and is replaced by another I/O device requiring a larger address size, e.g., two Mbyte, the new device cannot fit into the same address space formerly occupied by the device being replaced. In this case, a new block of address space must be assigned to the new I/O device, thus leaving the once occupied one Mbyte block unused. After hot swapping of a few I/O devices, there may be a number of unused memory blocks, thus causing the I/O space in the system memory to be fragmented, and a device may be prevented from being added even though there are sufficient free memory space.

Figure 1A:
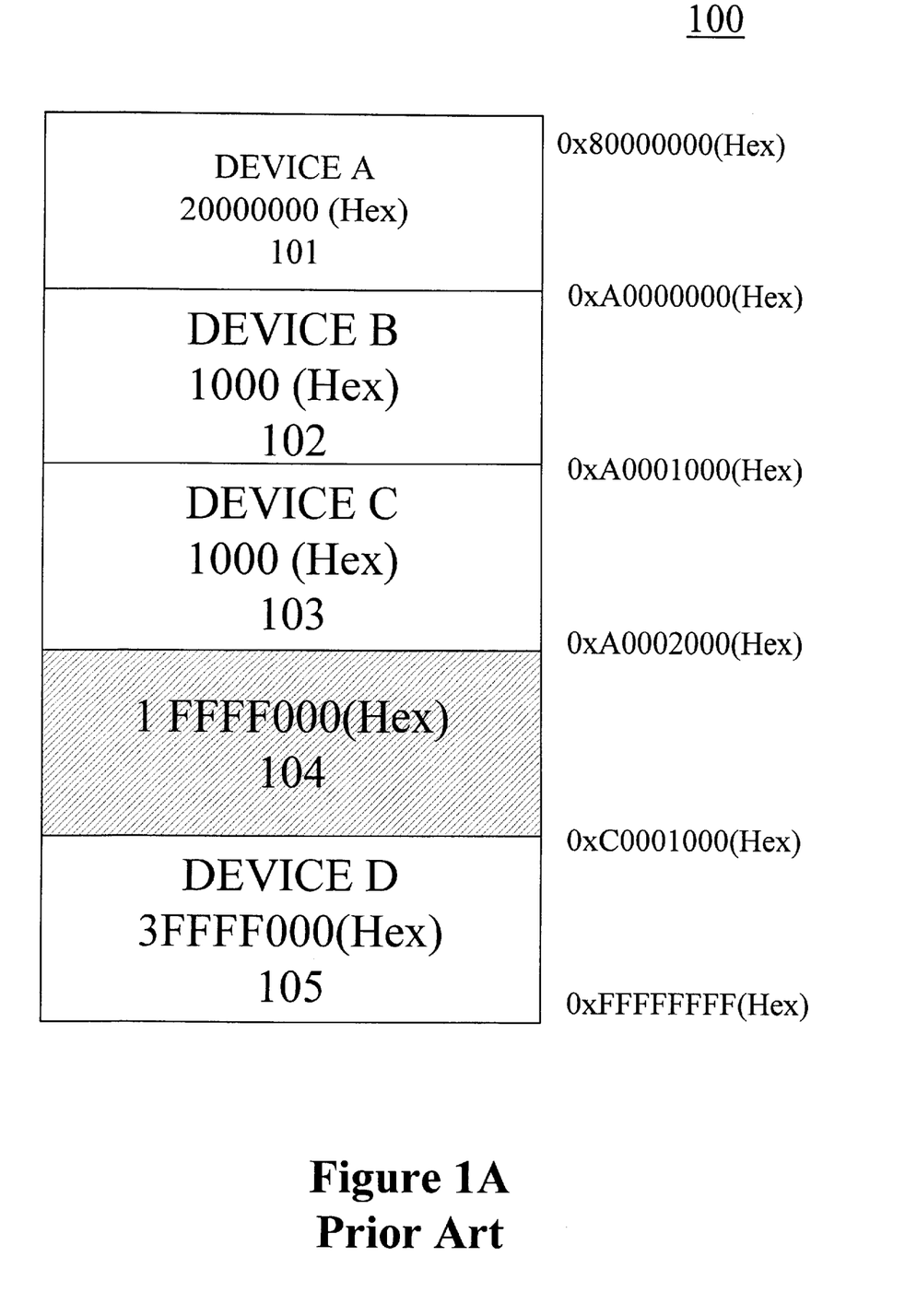
FIG. 1A is a diagram showing an I/O address space of a conventional memory mapped I/O computing system having a variable I/O device address assignment.

For example, assume an I/O address space 100 in the system memory comprises a two gigabyte (Gbyte) block (starting at the address 80000000 (HEX), and ending at the address FFFFFFFF (HEX)), and was assigned dynamically to then existing I/O devices, device A, device B, device C and device D, at system start-up as shown in FIG. 1A. The device A occupies the 20000000 (HEX) block 101 starting at address 0x80000000 (HEX). The device B occupies the 1000 (HEX) block 102 starting at address 0xA000000 (HEX). The device C occupies the 1000 (HEX) block 103 starting at 0xA0001000 (HEX). Finally, the device D occupies the 3FFFF000 (HEX) block 105 starting at address 0xC0001000 (HEX). The 1FFFF000 (HEX) block 104 is left unassigned, i.e., is a free space.

Figure 1B:
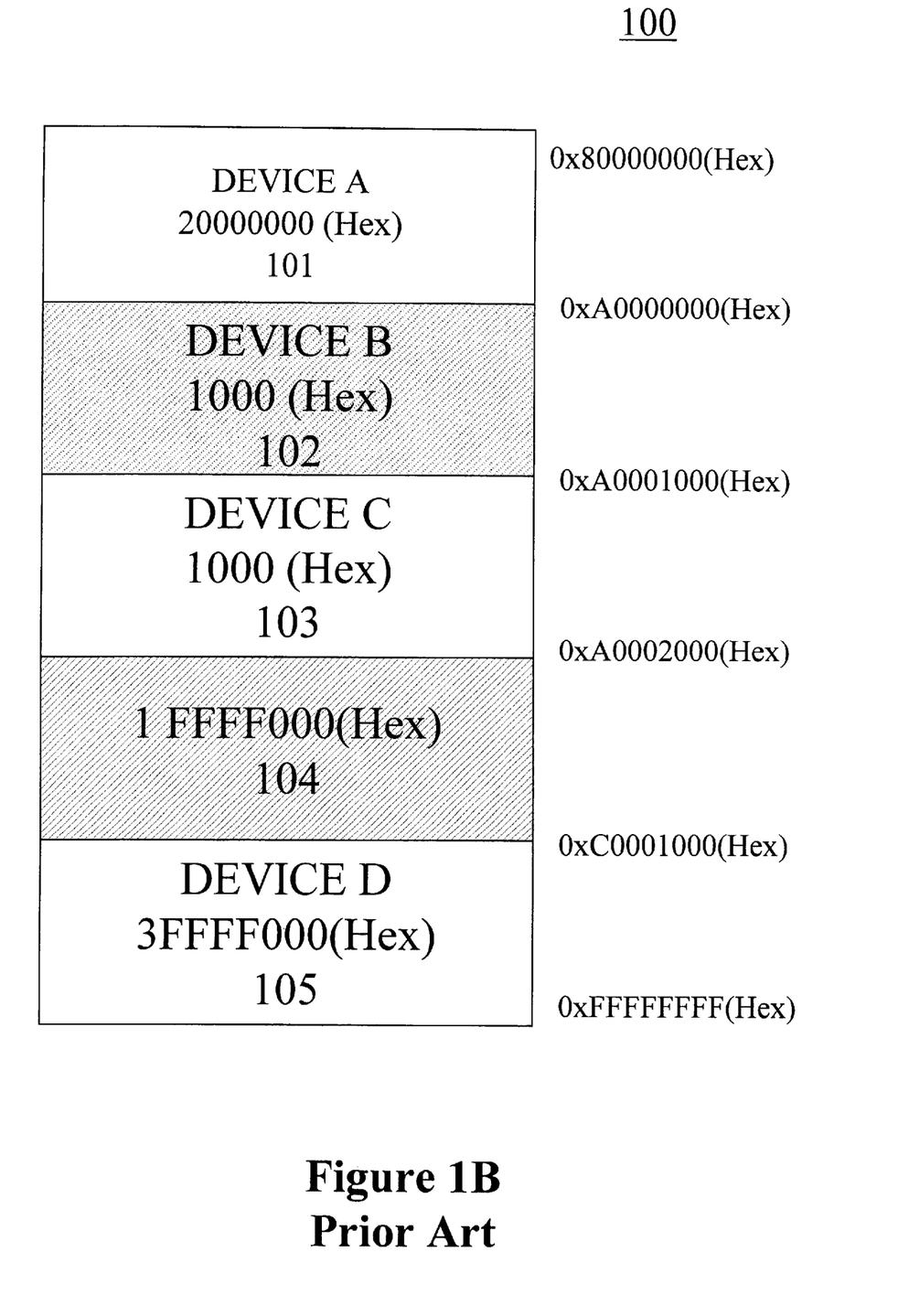
FIG. 1B is a diagram showing an I/O address space of a conventional memory mapped I/O computing system shown in FIG. 1A with one of the I/O device removed, i.e., hot swapped out.

Suppose now that the device B is removed on-line, i.e., hot swapped out, making the 1000 (HEX) block 102a available again as shown in FIG. 1B. Suppose further that it is desirable to add another device A to the system. As can be seen, although there is sufficient available memory space, i.e., the free blocks 102a and 104 together comprise a 20000000 (HEX) block sufficient to accommodate a device A, because there is no contiguous block having a size 2000000 (HEX), the second device A cannot be added.

The above described fragmentation of I/O memory space is wasteful of valuable system memory, and is thus inefficient.

Moreover, in most conventional systems, a direct map from the processor's address to the device address is provided. Although a typical system memory is capable of being addressed with a large number of bits, e.g., 64 bits, most I/O devices typically have a smaller number of address bits, e.g., 32 bits. That is, the smaller address space of I/O devices are directly mapped from a portion of the processor's address space for all I/O devices. Even in systems with multiple I/O buses, unique 32-bit I/O device addresses are used across all buses in the system.

However, unfortunately, this small number of I/O device address bits creates a limit of the total amount of I/O device space, e.g., to around 2 gigabytes ("GB") for all practical purposes for 32-bit I/O device addresses. As the number of I/O buses increases, the I/O memory space for each bus in the system becomes smaller. For example, if 1024 (e.g., $2^{32}$) I/O buses were possible in a 32-bit I/O device system, each bus may be allotted a portion of the memory that is as little as 2 MB. Some I/O devices, e.g., networking cards and most graphics cards, require a large address region, e.g., 16 MB or more, and thus cannot be accommodated in a small memory allotment afforded in a conventional system.

Thus, there is a need for a more efficient method and device for providing an I/O address mapping, which provides a convenient on-line replacement of various I/O devices having different memory capacity requirements without causing a fragmentation of I/O memory space in the system memory.

There is also a need for a more efficient method and device for providing an I/O address mapping, which provides a larger memory space for each of the I/O devices in the system than the number of address bits available from the I/O devices would allow.

SUMMARY OF INVENTION

In accordance with the principles of the present invention, a method of mapping an input/output address space into a system memory of a computing system having one or more input/output devices comprises providing the input/output address space within the system memory, the input/output address space being addressable by a (n+l)-bit processor view input/output address, each of n and l being an integer larger than 1, and translating the processor view input/output address to a n-bit I/O device view address to address the one or more input/output devices.

In addition, in accordance with the principles of the present invention, an apparatus for mapping an input/output address space in a computing system having one or more input/output devices comprises a system memory having the input/output address space stored therein, the input/output address space being addressable by a (n+l)-bit processor view input/output address, each of n and l being an integer larger than 1, and means for translating the processor view input/output address to a n-bit I/O device view address to address the one or more input/output devices.

In accordance with another aspect of the principles of the present invention, a computer system having one or more input/output devices comprises a system memory having an input/output address space stored therein, the input/output address space being addressable by a (n+l)-bit processor view input/output address, each of n and l being an integer larger than 1, and one or more host input/output bridges each addressing a corresponding group of one or more input/output buses, each of the one or more host input/output bridges configured to translate the processor view input/output address to a n-bit I/O device view address to address the one or more input/output devices.

DETAILED DESCRIPTION OF A PREFERRED EMBODIMENT

For simplicity and illustrative purposes, the principles of the present invention are described by referring mainly to an exemplary embodiment thereof. For example, while much of the following description of the present invention makes reference to an implementation with a specific number bits of system address, e.g., 40 bits, and a specific number of I/O device address bits, e.g., 32 bits, one of ordinary skill in the art would readily recognize that the same principles are equally applicable to, and can be implemented in, a system memory mapping of I/O devices using any number of address bits, and that any such variation would be within such modifications that do not depart from the true spirit and scope of the present invention.

Moreover, although the present invention is described with references to mapping I/O devices, it should be readily apparent to one skilled in the art that the principles of the present invention equally applies to mapping of any other components of the computer system.

In accordance with the principles of the present invention, an I/O mapping within a system memory of a computing system assigns a fixed address to each I/O device and I/O bridge in a larger address region of the system than the number of address bits of the I/O devices and/or the I/O bridges would allow. This fixed address assignment eliminates problems associated with fragmentation of I/O memory space of a conventional variable address assignment when I/O devices and/or I/O bridges are replaced on-line, i.e., hot-swapped. The I/O mapping utilizes a greater number of address bits than the address bits available from I/O devices to assign a much larger address space to each device by translating the larger number of bits address from the system to the smaller number of bits address of the I/O devices. For example, I/O devices with 32-bit addresses are mapped to 40-bit addresses in the system memory.

Figure 2:
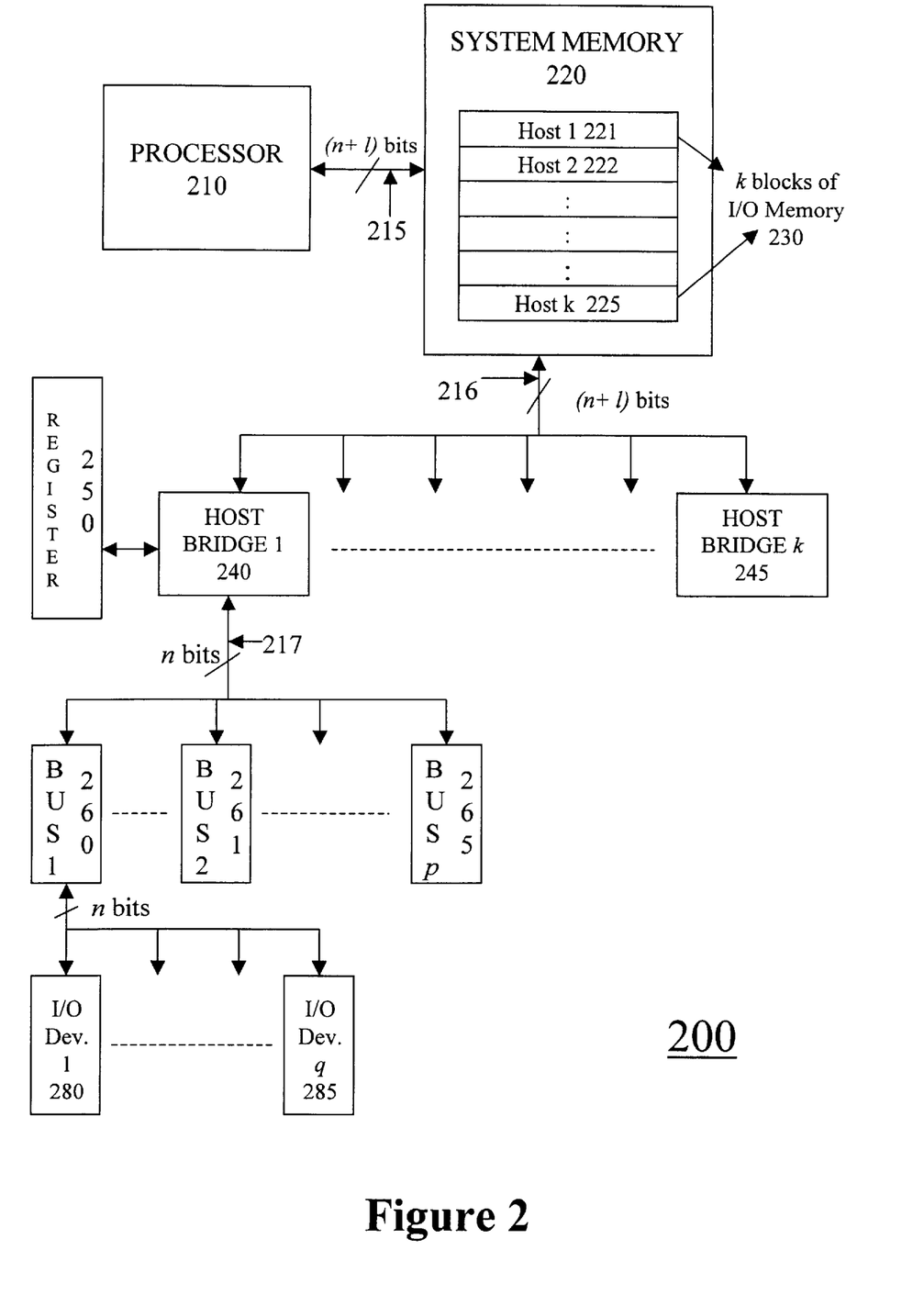
FIG. 2 is a diagram showing a memory mapped I/O system in accordance with the principles of the present invention.

In particular, FIG. 2 shows a memory mapped I/O system 200 according to one embodiment of the present invention. The processor 210 addresses the input/output ("I/O") address space 230 mapped into the system memory 220 by means of an (n+l)-bit address 215, where n is the number of standard address bits of most I/O devices, e.g., 32 bits, and l is the number of additional address bits available to the processor 210. The processor 210 may be a collection of processors that perform I/O operations to the I/O devices 280 to 285. The I/O address space mapping using the (n+l) address bits 215 provides the processor 210 with a "processor view" of I/O addressing, and allows assignment of a larger memory block to each of the I/O devices 280 to 285 than a conventional 32-bit addressing that may allow allotment of a fraction of 2 GB of total I/O memory space distributed among the input/output buses for each of the host I/O bridges. In a preferred embodiment of the present invention, the processor view comprises 40 address bits, and allows an allotment of a larger total I/O memory space, e.g., 64 GB.

The I/O address space 230 comprises k blocks of memory, 221 through 225, each being an equal size contiguous memory block. Each of the k blocks of I/O memory 230 is assigned to one of k host I/O bridges (221, 222, through 225). Each of the host I/O bridges 240 to 245 are addressed by the processor 210 by means of the (n+l)-bits processor view address 216.

Figure 3:
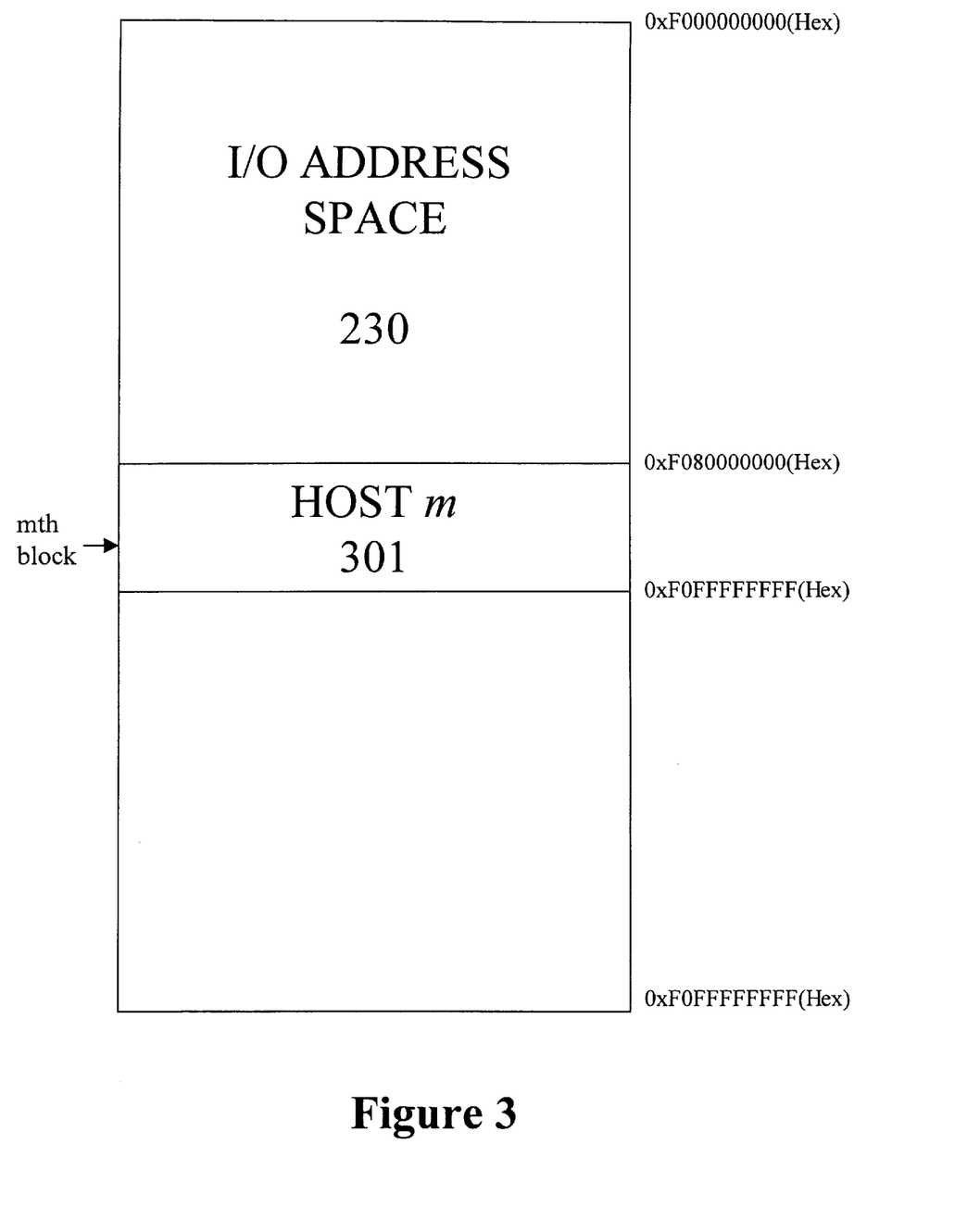
FIG. 3 is a block diagram showing an exemplary embodiment of the I/O address space shown in FIG. 2.

For example, as shown in FIG. 3, the processor view I/O map may assign the addresses 0×F000000000 (HEX) through 0×FFFFFFFFFF (HEX) as the total I/O memory space 230, allotting a total I/O memory space of 64 GB. By way of an example, there may be 32 host I/O bridges in this exemplary embodiment. One of the k equal size blocks may be assigned to one of the k I/O host bridge 240 to 245. For example, in the example shown in FIG. 3, a host bridge mis assigned to the $m^{th}$ block 301 having an address range of 0×F080000000 (HEX) through 0×F0FFFFFFFF (HEX). In the example shown in FIG. 2, the $m^{th}$ block is the second block (i.e., m=2) of the I/O address space 230.

Since I/O devices may be addressed using only n bits, each of the k host I/O bridges 240 to 245 has the responsibility of aliasing the received processor view address, which comprises a (n+l)-bit address, e.g., a 40-bit address, down to a n-bit address, e.g., a 32-bit address. In an embodiment of the present invention, one or more bits of the (n+l)-bit processor view address received by each host I/O bridge is used to identify which of the k host I/O bridges is assigned the memory block corresponding to the received processor view address.

Figure 4:
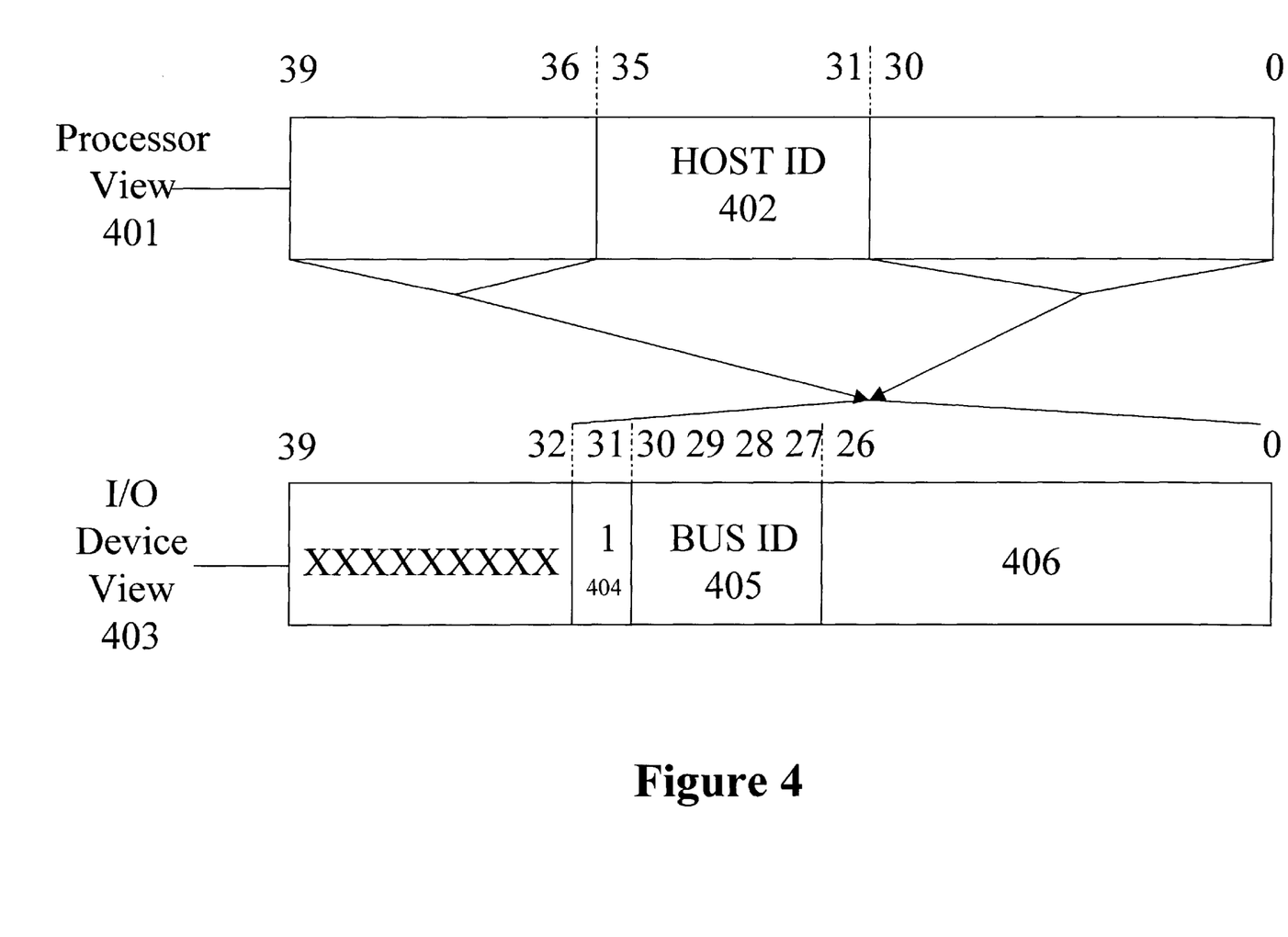
FIG. 4 is a diagram showing exemplary embodiment of the microprocessor view I/O address format and the I/O device view I/O address format.

For example, as shown in FIG. 4, the address bits [35:31] 402 of the processor view address 401 may be used as a host ID, from which each host I/O bridge may decide whether the current processor view address 401 is meant for the particular host I/O bridge. For example, the host I/O bridge m in the example shown in FIG. 3 would identify itself as the targeted host I/O bridge if the address bits [35:31] 402 has a particular value 00001. To this end, in an embodiment of the present invention, each of the host bridges 240 to 245 has an associated register 250 that has stored therein the range of address bits [35:31] 402 assigned to the associated host I/O bridge.

The host I/O bridges 240 to 245 may each be operably connected to and may control a number of (p) I/O buses 460–465. Each of the host I/O bridges 240 to 245 may be programmed to distribute the assigned address space into each of the p I/O buses 460–465. In the example shown in FIG. 3, the host I/O bridge m, when any processor view I/O address 401 in the range 0×F080000000 (HEX) through 0×F0FFFFFFFF (HEX) is received, translates the (n+l)-bit processor view I/O address to a 32-bit I/O device view I/O address.

An exemplary I/O device view I/O address 403 is shown in FIG. 4, in which the upper most bits, i.e., the bits 32 to 40, are masked out, e.g., by setting them to zeroes, to arrive at a 32-bit address, i.e., bits 0 through 31.

Each of the host I/O bridges 240 to 245 may be serving multiple I/O buses, e.g., I/O bus_1 260 to I/O bus_p 265. For example, in an embodiment of the present invention, a host I/O bridge may serve 12 I/O buses. The host I/O bridge may be programmed to divide up the assigned address space block, e.g., the block 301 shown in FIG. 3, among these 12 buses. In this example, for a better routing, the addresses are provided in a power of 2. In a preferred embodiment of the present invention, four I/O buses of the twelve I/O buses are provided with twice the amount of I/O address space other buses are allotted.

For example, the allotment of I/O memory among the multiple buses may be implemented as a distributed range by programming the register 250 to identify which of the I/O buses are to be allotted twice the address space. For example, for the host I/O bridge m shown in FIG. 3, if an I/O bus_1 260 is to be allotted $1/16$th of the address space, a processor view address falling in the range 0×F080000000 (HEX) to 0×F087FFFFFF (Hex) is assigned to the I/O bus_1 260. If I/O bus_2 261 is to be allotted twice the amount of the address space assigned to the I/O bus_1 260, then any address in the range 0×F088000000 (HEX) to 0×F08FFFFFFF (HEX) is assigned to I/O bus_2 261. To this end, as shown in FIG. 4, the bits [30:27] of the I/O device view I/O address 403 may be used as a Bus ID 405, from which the host I/O bridge m may determine the targeted I/O bus, e.g., by performing a look-up operation of a table (not shown) that maps the bits [30:27] (Bus ID 405) to a particular I/O bus.

Continuing with the above example, only $3/4$th of the I/O address space 230 may be allotted to the I/O buses since each host I/O bridge has twelve I/O buses attached thereto. To fully utilize the entire I/O address space, one or more I/O buses may be assigned to double or quadruple the I/O address space assigned to the other I/O buses. For example, if I/O bus_3 is identified as a high performance I/O bus that may support higher amount of memory, it can be assigned an address range, e.g., 0×F090000000 (HEX) to 0×F09FFFFFFF (HEX), which provides twice the amount of memory assigned to each of I/O bus_1 260 and I/O bus_2 261. In this example, if I/O bus_4 is identified to have a standard memory requirement, it will be assigned an address range 0×F0A000000 (HEX) to 0×F0A7FFFFFF (HEX).

For those I/O buses that have higher memory requirements, a bit map may be provided, e.g., in the register 250, to identify which ones of the I/O buses are to be assigned the standard, i.e., $1/16$th, double or even quadruple amount of memory.

An alternative embodiment of the present invention may use a range of the addresses, e.g., addresses 0×F080000000 (HEX) through 0×F0DFFFFFFF (HEX) as the distributed range (i.e., address bits [30:27] indicate the targeted I/O bus), and reserve the remaining addresses, e.g., the addresses 0×F0E000000 (HEX) through 0×F0FFFFFFFF (HEX), as one or more directed ranges that may be targeted to specific buses. A possible drawback of this exemplary embodiment may be that the addresses assigned to an I/O bus may not be contiguous if the I/O bus needs more than the $1/16$th distributed range it has been allotted while, in the previous example, a contiguous range of addresses is allocated.

Again referring to FIG. 2, although only the I/O bus_1 260 is shown to have connected thereto a plurality of I/O devices, each of the p I/O buses 260 to 265 may be operably connected to, and may address q I/O devices 280–285. Each I/O bus 260 addresses the I/O devices 280–285 by way of n-bit addresses, e.g., 32-bit addresses, in a manner similar to a conventional 32-bit addressing well known to those skilled in the art.

As can be appreciated, the I/O address space mapping described above provides a sufficient address space to each I/O device in the system, and thus the need for a dynamic assignment of addresses to I/O device is eliminated.

As can be also appreciated, the I/O address space mapping described above provides a pre-assigned address region, which is guaranteed to be available, to each of the I/O devices in the system, and thus provides a convenient on-line replacement of various I/O devices having different memory capacity requirements without causing an out-of-address-space problem associated with fragmentation of I/O memory space in the system memory.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents

What is claimed is:

1. A method of mapping an input/output address space into a system memory of a computing system having one or more input/output devices, comprising:

providing said input/output address space within said system memory, said input/output address space being addressable by a (n+l)-bit processor view input/output address, each of n and l being an integer larger than 1, wherein n is the number of address bits of the one or more input/output devices and l is the number of additional address bits available to the processor; and translating said (n+l)-bit processor view input/output address to a n-bit I/O device view address to address said one or more input/output devices.

2. The method of mapping an input/output address space in accordance with claim 1, further comprising:

assigning each of said one or more input/output devices a corresponding fixed-size portion of said input/output address space.

3. The method of mapping an input/output address space in accordance with claim 1, wherein:

said n equals thirty two; and said l equals eight.

4. A method of mapping an input/output address space into a system memory of a computing system having one or more input/output devices, comprising:

providing said input/output address space within said system memory, said input/output address space being addressable by a (n+l)-bit processor view input/output address, each of n and l being an integer larger than 1, wherein said computing system further comprises a plurality of input/output buses and a plurality of host input/output bridges each addressing a corresponding group of said plurality of input/output buses;

translating said processor view input/output address to a n-bit I/O device view address to address said one or more input/output devices;

assigning each of said one or more input/output devices a corresponding fixed-size portion of said input/output address space;

dividing said input/output address space into a plurality of equal size blocks; assigning each of said plurality of equal size blocks to a corresponding one of said plurality of host input/output bridges; and wherein said step of translating said (n+l)-bit processor view input/output address comprises:

identifying to which one of said plurality of host input/output bridges said (n+l)-bit processor view input/output address is directed by examining one or more bits of said (n+l)-bit processor view input/output address; and masking out at least l bits of said (n+l)-bit processor view input/output address to arrive at said n-bit I/O device view address.

5. The method of mapping an input/output address space in accordance with claim 4, further comprising:

determining to which input/output bus from said corresponding group of said plurality of input/output buses said (n+l)-bit processor view input/output address is directed.

6. The method of mapping an input/output address space in accordance with claim 4, wherein said identifying step comprises:

determining whether said one or more bits of said (n+l)-bit processor view input/output address have a value within a predetermined range.

7. The method of mapping an input/output address space in accordance with claim 4, further comprising:

assigning each of said plurality of input/output buses a fixed-size range of said input/output address space; and wherein one or more of said plurality of input/output buses are assigned twice amount of said input/output address space than other ones of said plurality of input/output buses.

8. An apparatus for mapping an input/output address space in a computing system having one or more input/output devices, comprising:

a system memory having said input/output address space stored therein, said input/output address space being addressable by a (n+l)-bit processor view input/output address, each of n and l being an integer larger than 1, wherein n is the number of address bits of the one or more input/output devices and l is the number of additional address bits available to the processor; and means for translating said (n+l)-bit processor view input/output address to a n-bit I/O device view address to address said one or more input/output devices.

9. The apparatus for mapping an input/output address space according to claim 8, further comprising:

means for assigning each of said one or more input/output devices a corresponding fixed-size portion of said input/output address space.

10. The apparatus for mapping an input/output address space according to claim 8, wherein:

said n equals thirty two; and said l equals eight.

11. An apparatus for mapping an input/output address space in a computing system having one or more input/output devices, comprising:

a system memory having said input/output address space stored therein, said input/output address space being addressable by a (n+l)-bit processor view input/output address, each of n and l being an integer larger than 1, wherein said computing system further comprises a plurality of input/output buses and a plurality of host input/output bridges each addressing a corresponding group of said plurality of input/output buses;

means for translating said processor view input/output address to a n-bit I/O device view address to address said one or more input/output devices;

means for assigning each of said one or more input/output devices a corresponding fixed-size portion of said input/output address space;

means for dividing said input/output address space into a plurality of equal size blocks;

means for assigning each of said plurality of equal size blocks to a corresponding one of said plurality of host input/output bridges; and wherein said means for translating said (n+l)-bit processor view input/output address comprises:

means for identifying which one of said plurality of host input/output bridges to which said (n+l)-bit processor view input/output address is directed by examining one or more bits of said (n+l)-bit processor view input/output address; and means for masking out at least l bits of said (n+l)-bit processor view input/output address to arrive at said n-bit I/O device view address.

12. The apparatus for mapping an input/output address space according to claim 11, further comprising:

means for determining which input/output bus from said corresponding group of said plurality of input/output buses to which said (n+l)-bit processor view input/output address is directed.

13. The apparatus for mapping an input/output address space according to claim 11, wherein said means for identifying which one of said plurality of host input/output bridges comprises:

means for determining whether said one or more bits of said (n+l)-bit processor view input/output address have a value within a predetermined range.

14. The apparatus for mapping an input/output address space according to claim 11, further comprising:

means for assigning each of said plurality of input/output buses a fixed-size range of said input/output address space; and wherein one or more of said plurality of input/output buses are assigned twice amount of said input/output address space than other ones of said plurality of input/output buses.

15. A computer system having one or more input/output devices, comprising:

a system memory having an input/output address space stored therein, said input/output address space being addressable by a (n+l)-bit processor view input/output address, each of n and l being an integer larger than 1, wherein n is the number of address bits of the one or more input/output devices and l is the number of additional address bits available to the processor; and one or more host input/output bridges each addressing a corresponding group of one or more input/output buses, each of said one or more host input/output bridges configured to translate said (n+l)-bit processor view input/output address to a n-bit I/O device view address to address said one or more input/output devices.

16. The computer system according to claim 15, wherein:

said n equals thirty two; and said l equals eight.

17. A computer system having one or more input/output devices, comprising:

a system memory having an input/output address space stored therein, said input/output address space being addressable by a (n+l)-bit processor view input/output address, each of n and l being an integer larger than 1; and one or more host input/output bridges each addressing a corresponding group of one or more input/output buses, each of said one or more host input/output bridges configured to translate said processor view input/output address to a n-bit I/O device view address to address said one or more input/output devices, wherein: said input/output address space is divided into a plurality of equal size blocks, each of said plurality of equal size blocks being assigned to a corresponding one of said one or more host input/output bridges; and wherein each of said one or more host input/output bridges are configured to identify whether said (n+l)-bit processor view input/output address is directed thereto by examining one or more bits of said (n+l)-bit processor view input/output address, and configured to mask out at least l bits of said (n+l)-bit processor view input/output address to arrive at said n-bit I/O device view address.

18. The computer system according to claim 17, wherein:

each of said one or more host input/output bridges are further configured to determine which input/output bus from said corresponding group of said plurality of input/output buses to which said (n+l)-bit processor view input/output address is directed.

19. The computer system according to claim 18, wherein:

each of said one or more host input/output bridges are further configured to determine whether said one or more bits of said (n+l)-bit processor view input/output address have a value within a predetermined range.

20. The computer system according to claim 18, wherein:

each of said plurality of input/output buses is assigned a fixed-size range of said input/output address space; and wherein one or more of said plurality of input/output buses are assigned twice amount of said input/output address space than other ones of said plurality of input/output buses.

* * * * *